United States Patent [19]

Kruger et al.

[11] Patent Number: 4,478,794

[45] Date of Patent: Oct. 23, 1984

[54] ROASTING OF MIXED SULPHIDE ORES OR CONCENTRATES

[75] Inventors: Albert Kruger, Redland; Richard Healey, Clevedon, both of England

[73] Assignees: Metallurgical Processes Limited, Nassau, The Bahamas; I. S. C. Smelting Limited, London, England

[21] Appl. No.: 471,709

[22] Filed: Mar. 3, 1983

[51] Int. Cl.$^3$ .......................... C01G 17/06; C22B 1/02
[52] U.S. Cl. ...................................... 423/89; 423/99; 423/100; 75/7
[58] Field of Search .................. 423/89, 99, 110; 75/7

[56] References Cited

U.S. PATENT DOCUMENTS

| | | | |
|---|---|---|---|
| 1,749,125 | 3/1930 | Brinker | 423/110 |
| 2,039,645 | 5/1936 | Hechenbleikner | 423/110 |
| 4,231,791 | 11/1980 | Charles | 75/7 |
| 4,274,878 | 6/1981 | Charler | 75/7 |

FOREIGN PATENT DOCUMENTS

| | | |
|---|---|---|
| 1302864 | 1/1973 | United Kingdom . |
| 1394609 | 5/1975 | United Kingdom . |
| 2024792 | 1/1980 | United Kingdom . |

OTHER PUBLICATIONS

Sellwood, *The Mining Journal*, pp. 434–435, (1960).

Primary Examiner—Gregory A. Heller
Attorney, Agent, or Firm—Holman & Stern

[57] ABSTRACT

In the roasting (oxidation) of mixed zinc sulphide/lead sulphide concentrates, to give an oxidic product for reduction, improved sulphur elimination and reduced lead volatilization are achieved by mixing 2–20% by weight of zinc oxide with the mixed sulphide materials, forming pellets of 2–15 mm diameter and roasting these under controlled oxidation conditions, firstly at a lower temperature and then at a higher temperature; preferably at 850°–950° C. for the first stage and at 950°–1050° C. for the last stage.

5 Claims, No Drawings

ROASTING OF MIXED SULPHIDE ORES OR CONCENTRATES

This invention relates to the roasting (oxidation) of sulphide ores or concentrates and more particularly to the roasting of raw materials containing both zinc sulphide and lead sulphide.

The usual method of roasting such materials to give an oxidic feed, for a smelting process, is by sinter roasting on a conventional Dwight-Lloyd sinter machine with updraught of air to support combustion (see for example "Updraught zinc/lead sintering" by R. M. Sellwood, Mining Journal 1960, 254, 15th April, 434–435). Using this technique concentrates containing up to 25% by weight of lead sulphide can be roasted.

There is however a need to develop a roasting process for concentrates containing zinc sulphide and lead sulphide, which is independent of this sintering technique. It is known that if such materials can be calcined to particulate oxide form then they can be densified into briquettes which are suitable for feeding to a blast-furnace, e.g. by the techniques described in our British patent specification Nos. 1,302,864 and 1,394,609.

One approach to this problem, by forming pellets having a lead sulphide core and a zinc sulphide shell, for subsequent roasting, is set out in our U.K. patent specification No. 2,024,792 published Jan. 16, 1980. This approach is aimed at preventing molten phases causing pellet agglomeration. However certain residual problems remain with such a roasting technique and these problems are even more marked when homogeneously mixed zinc sulphide/lead sulphide concentrates are to be roasted. The problems are principally:

(a) loss of lead by volatilization (probably as sulphide) during roasting, (b) incomplete or inadequate sulphur elimination from the roasted pellet.

We have now found that by addition of controlled amounts of zinc oxide to zinc and/or lead sulphides to be roasted, coupled with the use of carefully controlled oxidation conditions these problems can be greatly ameliorated or largely overcome.

This invention consists in a process for roasting a material containing both zinc sulphide and lead sulphide, to give an oxidic product, comprising forming the material into pellets of between 2 and 15 mm diameter, with the incorporation of between 2 and 20% by weight of zinc oxide powder, and roasting these pellets in an oxygen-containing gas in at least two stages, the first being at a lower temperature and the last being at a higher temperature.

Preferably the first oxidation stage is conducted at 850°–950° C. and the last is conducted at 950°–1050° C.

Preferably the amount of zinc oxide incorporated in the pellets is between 2% and 10% based on the pellet weight.

Preferably the pellets are formed from mixed zinc sulphide and lead sulphide concentrates. However, the pellets may be formed having a substantially lead sulphide core and a substantially zinc sulphide shell according to the technique described in U.K. patent specification No. 2,024,792.

Preferably the oxygen-containing gas is air or a roaster gas containing $SO_2$ and oxygen.

In this way it is possible to obtain roasted pellets containing less than 1% of residual sulphur coupled with 25% or less lead volatilization (equivalent to a sinter roasting process).

The invention will be further described by reference to the following experimental runs in which "cored" and mixed ZnS/PbS pellets were roasted with and without zinc oxide additions. In each case pellets, of 5 mm diameter, were prepared from zinc and lead sulphide concentrates (of analyses A and B as set out below). The water used for pelletizing contained 25% sulphite lye. The specific gravity of the green pellets was about 3.0. Weight loss upon drying to 120° C. was 8%.

|  | Zn | Pb | Fe | S |
|---|---|---|---|---|
| Zinc sulphide concentrate (A) | 51.8 | 1.3 | 10.1 | 32.2 |
| Lead sulphide concentrate (B) | 8.0 | 57.4 | 8.3 | 20.9 |

The batches of pellets used in the experimental runs had the following compositions:

| Batch | Pellet Type | Additions | Pb | Zn | S |
|---|---|---|---|---|---|
| 16 | Cored (PbS Core/ ZnS Shell) | 5% ZnO in each Concentrate | 18.2 | 39.3 | 27.1 |
| 18 | Cored | No ZnO | 17.6 | 37.3 | 28.4 |
| 19 | Mixed | 8% ZnO in mix | 20.4 | 39.0 | 25.6 |
| 21 | Mixed | No ZnO | 17.5 | 35.7 | 27.6 |

The details of roasting conditions were as follows:

Batch 16 (cored) pellets with ZnO

Furnace temperature 930° C. for 3 minutes then 990° C. for times as shown.
Gas 10.8% $O_2$, 6.5% $SO_2$, Gas flow 1.562 l/m
Air flow 1.635 l/m Batch 18 (cored) pellets no ZnO Furnace temperature 930° C. for 3 minutes then 985° C. for the times as shown
Gas 10.8% $O_2$, 6.5% $SO_2$, Gas flow 1.562 l/m
Air flow 1.635 l/m The final compositions were as follows ('a' and 'b' represent duplicate runs)

| Time (min) | | Sulphur | | Lead | |
|---|---|---|---|---|---|
| Gas | Air | (a) | (b) | (a) | (b) |
| 30 | 10 | 4.4 | 5.4 | 18.3 | 16.9 |
| 30 | 20 | 3.2 | 1.8 | 16.8 | 17.0 |
| 30 | 30 | 1.4 | 2.2 | 16.9 | 17.5 |
| 30 | 40 | 1.2 | 1.4 | 16.3 | 13.2 |
| 40 | 10 | 2.7 | 4.4 | 16.4 | 16.6 |
| 40 | 20 | 2.0 | 2.0 | 16.5 | 16.1 |
| 40 | 30 | 1.7 | 1.5 | 17.6 | 16.1 |
| 40 | 40 | 1.2 | 1.1 | 14.7 | 15.9 |
| 50 | 10 | 2.7 | 2.9 | 19.5 | 17.1 |
| 50 | 20 | 2.4 | 2.0 | 17.0 | 17.0 |
| 50 | 30 | 1.4 | 1.3 | 16.6 | 16.5 |
| 50 | 40 | 1.1 | 1.2 | 15.6 | 16.1 |
| 30 | 10 | 1.4 | 1.4 | 12.7 | 12.8 |
| 30 | 20 | 1.3 | 1.2 | 9.2 | 12.9 |
| 30 | 30 | 1.2 | 1.0 | 14.1 | 13.9 |
| 30 | 40 | 1.3 | 1.4 | 14.8 | 11.2 |
| 40 | 10 | 1.2 | 1.5 | 10.9 | 15.7 |
| 40 | 20 | 1.1 | 1.2 | 11.1 | 12.1 |
| 40 | 30 | 1.1 | 1.3 | 15.1 | 12.9 |
| 40 | 40 | 1.0 | 0.8 | 11.2 | 7.6 |
| 50 | 10 | 2.1 | 1.2 | 11.8 | 13.3 |
| 50 | 20 | 1.2 | 1.4 | 11.8 | 13.1 |
| 50 | 30 | 1.2 | 1.6 | 8.8 | 12.2 |

-continued

| Time (min) | | Sulphur | | Lead | |
|---|---|---|---|---|---|
| Gas | Air | (a) | (b) | (a) | (b) |
| 50 | 40 | 0.9 | 0.9 | 11.8 | 9.3 |

When the above results are compared the following statistical effects are shown, where P is the probability of the null hypothesis.

| | Sulphur content | Final lead/ original lead |
|---|---|---|
| Gas | $P < 0.05$ | not significant |
| Air | not significant | $P < 0.05$ |
| ZnO addn. | not significant | $P << 0.001$ |
| Gas × ZnO | $P < 0.05$ | not significant |
| Air × ZnO | $P < 0.001$ | not significant |

This shows an extremely significant effect of ZnO addition in reducing lead volatilization levels.

Sulphur elmination appears to be adversely affected by zinc oxide additions when the roasting time with air is short, but not when this time is made longer. A combination of zinc oxide addition and adequate roasting conditions (as expressed in the statements of invention) therefore produces both good lead retention and good sulphur elimination.

In order to illustrate the effects on sulphur elimination and lead retention in continuous runs the following figures are quoted:

Furnace temperature 890° C., raised to 960° C. after 40 minutes.

Gas 11.3% $O_2$, 6.5% $SO_2$ Gas flow 1.112 liters/minute. Air flow 1.0 liters/minute. $N_2$ flow 1.0 liters/minute.

Weight of pellets 30 g—initial charge 10 g followed by 10 pellets every 2 minutes—charging completed in 20 minutes.

The abbreviations used in the table are as follows: WL=% wt. loss, LWL=% wt. loss of lead during roasting $SO_2$, $O_2$=estimated composition (by volume) of roast gas produced if gas used during first stage is assumed to be recirculated from second stage and period on nitrogen is excluded. (Nitrogen actually has no effect on roasting).

| | Time (min) | | | | | | | | |
|---|---|---|---|---|---|---|---|---|---|
| Run | Gas | Air | $N_2$ | S | Pb | WL | LWL | $SO_2$ | $O_2$ |
| Batch 18 (cored pellets) No ZnO Initial Pb 17.6% | | | | | | | | | |
| 627 | 20 | 90 | 10 | 1.1 | 19.6 | 22.0 | 13.1 | 6.6 | 11.5 |
| Batch 16 (cored pellets) 5% ZnO in both Pb 18.2% | | | | | | | | | |
| 607 | 20 | 90 | 10 | 0.9 | 21.2 | 16.0 | 2.2 | 6.3 | 11.9 |
| Batch 21 (mixed pellets) No ZnO Initial Pb 17.5% | | | | | | | | | |
| 617 | 20 | 80 | 10 | 2.1 | 14.6 | 21.3 | 34.3 | 6.8 | 10.7 |
| Batch 19 (mixed pellets) 8% ZnO Initial Pb 20.4% | | | | | | | | | |
| 615 | 20 | 80 | 10 | 0.9 | 18.7 | 17.0 | 23.9 | 6.8 | 11.3 |

As can be seen from the S and LWL columns, the use of zinc oxide at 5% and 8% levels allows sulphur eliminations down to 1.0% S to be achieved, while lead losses can be kept down to 25% or below.

We claim:

1. A process for roasting a material composed essentially of zinc sulphide and lead sulphide, to give an oxidic product, comprising first incorporating about 2% to 20% by weight of ZnO powder into said material and then forming the material into pellets of about 2 and 15 mm diameter and then roasting these pellets in an oxygen-containing gas in at least two stages, the first stage being at a temperature of about 850° C. to 950° C. and the last stage being at a higher temperature than the first stage, of about 950° C. to about 1050° C.

2. The process according to claim 1, wherein the zinc oxide content of the pellets is between 2 and 10% by weight.

3. The process according to claim 1, wherein the pellets are formed from mixed zinc sulphide and lead sulphide concentrates.

4. The process according to claim 1, wherein pellets are formed having a substantially lead sulphide core and a substantially zinc sulphide shell.

5. The process according to claim 1, wherein the oxygen-containing gas is selected from the group consisting of air and a roaster gas containing $SO_2$ and oxygen.

* * * * *